United States Patent [19]

Saito

[11] Patent Number: 4,919,434
[45] Date of Patent: Apr. 24, 1990

[54] GOLF BALL

[75] Inventor: Tasuku Saito, Tokorozawa, Japan

[73] Assignee: Bridgestone Corporation, Tokyo, Japan

[21] Appl. No.: 223,934

[22] Filed: Jul. 25, 1988

Related U.S. Application Data

[63] Continuation-in-part of Ser. No. 53,123, May 22, 1987, abandoned.

[30] Foreign Application Priority Data

May 23, 1986 [JP] Japan ................................ 61-117160

[51] Int. Cl.$^5$ ............................................. A63B 37/12
[52] U.S. Cl. .................................. 273/235 R; 273/218
[58] Field of Search ........... 273/235 R, 235 A, 235 B, 273/220, 218, 62, 230

[56] References Cited

U.S. PATENT DOCUMENTS

| | | | |
|---|---|---|---|
| 3,458,205 | 7/1969 | Smith et al. | 273/235 R |
| 4,090,716 | 5/1978 | Martin et al. | 273/232 |
| 4,337,946 | 7/1982 | Saito et al. | 273/235 R |
| 4,431,193 | 2/1984 | Nesbitt | 273/218 |
| 4,570,937 | 2/1986 | Yamada | 273/218 |

FOREIGN PATENT DOCUMENTS

| | | | |
|---|---|---|---|
| 59-37961 | 3/1984 | Japan | 273/220 |
| 59-49780 | 3/1984 | Japan | 273/232 |
| 59-129072 | 7/1984 | Japan | 273/220 |
| 1095615 | 12/1967 | United Kingdom | 273/220 |

OTHER PUBLICATIONS

ASTM-D638, "Standard Test Method for Tensile Properties of Plastics", pp. 210–227.
ASTM-D790, "Standard Test Methods for Flexural Properties of Unreinforced and Reinforced Plastics and Electrical Insulating Materials", pp. 389–401.

Primary Examiner—George J. Marlo
Attorney, Agent, or Firm—Birch, Stewart, Kolasch & Birch

[57] ABSTRACT

Disclosed herein is a two-piece type solid golf ball formed by enclosing a solid core with a thermoplastic resin cover. It provides a long overall distance, improved controllability, extended durability, and good shot feeling. The solid core contains polybutadiene having more than 40% of cis-1,4 bonds and an unsaturated carboxylic acid and/or a metal salt thereof to crosslink the polybutadiene and deforms 1.5 to 3.5 mm under a constant load of 100 kg. The cover is 0.4 to 2.2 mm thick and consists of a 0.1 to 2 mm thick inner layer and a 0.1 to 1.5 mm thick outer layer enclosing the inner layer, both made of thermoplastic resins, said inner layer generating a stress of 20 to 100 kg/cm$^2$ at 10% elongation and having a resilience higher than 40%, and said outer layer having a flexural modulus of 2000 to 5000 kg/cm$^2$ and a resilience higher than 35%.

10 Claims, 1 Drawing Sheet

GOLF BALL

CROSS REFERENCE TO RELATED APPLICATION

This application is a continuation-in-part of copending application Ser. No. 053,123 filed on May 22, 1987 and now abandoned, the entire contents of which are hereby incorporated by reference.

BACKGROUND OF THE INVENTION

1. Field of the Invention:

The present invention relates to a two piece type solid golf ball formed by covering a solid core with a thermoplastic resin cover. More particularly, it relates to a solid golf ball which provides a long overall distance, improved controlability, extended durability, and good shot feeling.

2. Description of the Prior Art

There has been known a two-piece type solid golf ball formed by covering a solid core with a thermoplastic resin cover, said solid core being produced by mixing polybutadiene rubber, unsaturated carboxylic acid (such as methacrylic acid), zinc oxide and peroxide, and molding the mixture with heating. As the cover material, a hard ionomer resin is usually used because of its superiority in cut resistance. The solid golf ball having a cover of ionomer resin has superior durability and good flight performance. Moreover, in order to improve the coefficient of restitution (initial velocity at impact) of a solid golf ball, there has been proposed an idea of increasing the thickness of the ionomer resin cover to about 2.1 to 2.5 mm (Japanese Patent Laid-open Nos. 37961/1984 and 49780/1984).

However, as compared with a thread-wound golf ball, a solid ball is by far inferior in controlability required when the shot is made by a middle iron or short iron. In addition, a solid golf ball provides a poor shot feeling. For this reason, most professional golfers do not use solid golf balls in a tournament.

Proposals put forward for improving the shot feeling of conventional solid golf balls include lowering the hardness of the solid core and forming the cover from a soft material. Neither of these proposals provide satisfactory balls because they are possible only with the sacrifice of flight performance and durability.

On the other hand, thread-wound golf balls are used by many professional golfers in a tournament because of their superior carry and controlability. However, they are poor in durability (cut resistance and fatigue resistance). Moreover, their flight performance cannot be fully exerted and they are inferior in overall distance as compared with two-piece type solid golf balls when used by amateur players. For this reason, most amateur players use two-piece type solid golf balls.

For the improvement of thread-wound golf balls in overall distance when used by amateurs, there has been proposed an idea of replacing the core with the one which is lighter and larger in diameter and replacing the cover with the one having a higher specific gravity, thereby increasing the moment of inertia (Japanese Patent Laid-open No. 129072/1984). Despite this proposal, the conventional thread-wound golf balls are not comparable to two-piece type solid golf balls in overall distance and durability.

Accordingly, there has been a demand for golf balls which have as long overall distance and durability as solid golf balls and as good controlability and shot feeling as thread-wound golf balls. Nevertheless, almost no proposals have been made for such golf balls. The present invention was completed to meet the need.

SUMMARY OF THE INVENTION

Accordingly, it is an object of the present invention to provide a new solid golf ball which is equal to or better than conventional solid golf balls in flight performance when hit by a driver (which is designed for a long overall distance) and is equal to thread-wound golf balls in controlability when hit by a middle iron or short iron (which is designed for the accurate control of carry). In addition, the solid golf ball of the present invention provides a good shot feeling and is superior in durability such as fatigue resistance and cut resistance.

In order to achieve the above-mentioned object, the present inventor produced several types of solid golf balls on an experimental basis. They have the solid core which varies in physical properties and the cover which varies in physical properties, thickness, and the number of layers. The balls were examined for their characteristic properties by actually hitting them with various golf clubs including woods, irons, and putters. Furthermore, in order to improve the controlability of the ball, the present inventor investigated the relation between the loft angle of a club and the spin performance of a ball. As a result, it was found that the object is achieved by a solid golf ball made up of a solid core and a cover enclosing said solid core, characterized in that said solid core is one which contains polybutadiene having more than 40% of cis-1,4 bond and an unsaturated carboxylic acid and/or a metal salt thereof to crosslink the polybutadiene and deforms 1.5 to 3.5 mm under a constant load of 100 kg, and said cover is a 0.4 to 2.2 mm thick which consists of a 0.1 to 2 mm thick inner layer and a 0.1 to 1.5 mm thick outer layer enclosing the inner layer, both made of thermoplastic resins, said inner layer having a stress of 20 to 100 kg/cm$^2$ at 10% elongation and having a resilience higher than 40%, and said outer layer having a flexural modulus of 2000 to 5000 kg/cm$^2$ and a resilience higher than 35%. The golf ball constructed as mentioned above is equal to or better than conventional solid golf balls when hit with a wood club (which is intended for a long overall distance) in flight performance. In addition, it has excellent controlability when hit with a middle iron or short iron (which needs good control), because it has a good spin characteristics as thread-wound golf balls. It also has excellent coefficient of restitution properties to ensure a long overall distance. Further, it provides a good shot feeling and has good durability such as fatigue failure resistance and cut resistance.

According to the present invention, the soft inner cover layer improves controlability and shot feeling without decreasing the coefficient of restitution. It also permits the hard outer cover layer to have an optimum thickness because it can be molded in any form which corresponds to the shape of dimples.

On the other hand, the hard outer layer permits dimples to be formed on it, and it also affects the ball's spin characteristics according to the clubface used. In addition, it greatly contributes to improvement in the coefficient of restitution, durability, and feeling of balls.

There is disclosed in Japanese Patent Laid-open No. 92372/1983 or U.S. Pat. No. 4,431,193 a solid golf ball of a two-layered structure. According to this disclosure, the golf ball is composed of an elastic core and two layers surrounding the core. The outer layer is made of a soft, less stiff solid resin or foamed resin. It is claimed that this solid golf ball has the characteristic coefficient of restitution and provides the same feeling and function as the balata-covered, thread-wound golf ball does.

However, the disclosure merely indicates that a ball of soft feeling can be obtained without any decrease in the coefficient of restitution. It is not concerned with the ball's spin characteristics which directly affect the flight performance and controlability. In this ball, the inner and outer cover layers are reversed in contrast with the ball of the present invention. The structure just mentioned above does not produce the effect intended in the present invention.

The above and other objects, features and advantages of the invention will be more apparent from the following description.

DETAILED DESCRIPTION OF THE INVENTION

Figure 1:
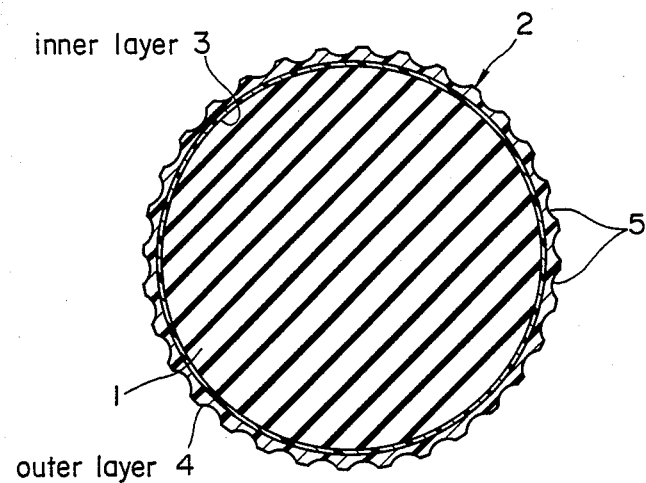
FIG. 1 is a cross-sectional view of a two-piece golf ball having a solid core 1 and a cover 2 consisting of an inner layer 3 and an outer layer 4 having dimples 5.

The solid golf ball according to the present invention has a solid core and a cover enclosing the core.

According to the present invention, the solid core is one which contains polybutadiene having more than 40%, preferably more than 60%, and more preferably more than 85% of cis-1,4 bond and an unsaturated carboxylic acid and/or a metal salt thereof to crosslink the polybutadiene and deforms 1.5 to 3.5 mm, preferably 1.8 to 3.2 mm under a constant load of 100 kg. The deformation under a constant load of 100 kg means the amount of deformation measured when a load of 100 kg is applied to a spherical solid core.

The solid core may be incorporated with other rubbers such as styrene-butadiene rubber, natural rubber, isoprene rubber, etc. in addition to the polybutadiene rubber. The amount of polybutadiene rubber in all the rubber components should be more than 50%, preferably more than 70% by weight.

The unsaturated carboxylic acid or metal salt thereof to crosslink polybutadiene includes acrylic acid and methocrylic acid and divalent metal (e.g., zinc) salts thereof. They may be used individually or in combination with one another. The preferred amount of the unsaturated carboxylic acid or metal salt thereof is 10 to 60 parts by weight per 100 parts by weight of polybutadiene.

The solid core may also be incorporated with a filler such as zinc oxide, barium sulfate, calcium carbonate, and silica usually in an amount of 10 to 70 parts by weight per 100 parts by weight of polybutadiene; a crosslinking agent such as organic peroxides including di-cumylperoxide and 1,1-dibutylperoxy-3,5,5-trimethyl cyclohexane usually in an amount of 0.1 to 6 parts by weight per 100 parts by weight of polybutadiene; and additives which are commonly used for the molding of the solid core.

To be more specific, the solid core is produced by heat-curing a compound composed of 100 parts by weight of polybutadiene having the cis-1,4 bond, 10-30 parts by weight of acrylic acid and/or methacrylic acid, 10-70 parts by weight of filler such as zinc oxide, and 0.5-6 parts by weight of peroxide, or a compound composed of 100 parts by weight of polybutadiene having the cis-1,4 bond, 20-60 parts by weight of metal salt of unsaturated carboxylic acid (e.g., zinc acrylate and zinc methacrylate), 10-50 parts by weight of filler, and 0.1-5 parts by weight of peroxide. The heat-curing may be carried out at 110° to 190° C. for 3 to 90 minutes.

It is necessary that the solid core which is formed from the above-mentioned components with the above-mentioned curing conditions deforms 1.5 to 3.5 mm, preferably 1.8 to 3.2 mm, under a constant load of 100 kg. This amount of deformation is essential for the solid golf ball having the outstanding characteristics. If the amount of deformation is less than 1.5 mm, the resulting ball is so hard that it provides a poor shot feeling. Conversely, if it is greater than 3.5 mm, the ball is poor in the coefficient of restitution and durability. It should be noted that the solid core having the deformation of 1.5 to 3.5 mm is selected from ones obtained from the above preparation procedure.

The solid core for the two-piece ball is required to have a narrow hardness distribution. In other words, the difference between the hardness at the center of the solid core and that at outside should be less than 10%, preferably less than 5%, when measured by using a JIS (Japanese Industrial Standard)-A hardness tester.

The difference in hardness between the center and the periphery of the solid core is preferably 10% or less, more preferably 5% or less. The difference in hardness between the center and the periphery of the solid core is defined as $$(A-B)/A \times 100 \, (\%)$$

wherein "A" is the hardness of the periphery of the solid core and "B" is the hardness of the center of the solid core.

Figure 2:
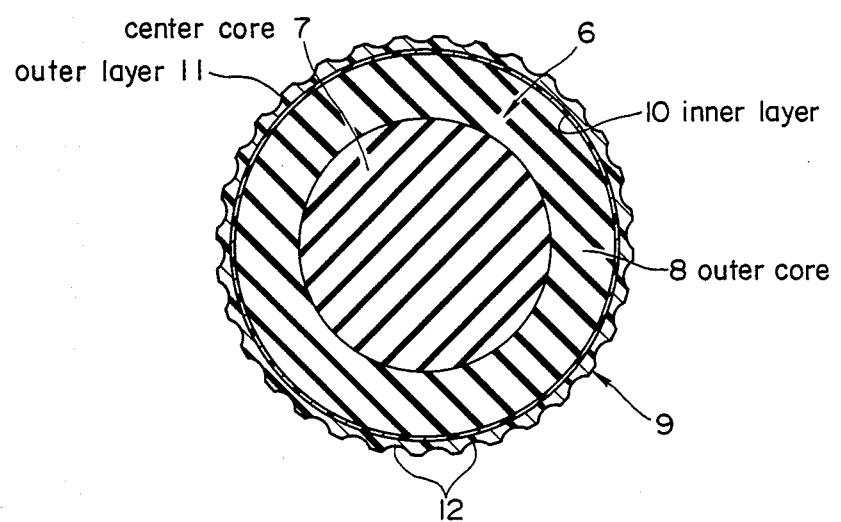
FIG. 2 is a cross-sectional view of a three-piece golf ball having a core 6 made of a center core 7, an outer core 8, and a cover 9 consisting of an inner layer 10 and outer layer 11 having dimples 12.

The solid core used in the present invention may be of a solid structure or of a layered structure as shown in FIGS. 1 and 2. In the former case, the solid core is made of the above-mentioned materials and the two-piece golf ball is formed by enclosing the solid core with a cover. In the latter case, the solid core is made up of a central part (center cores) and one or more peripheral parts (outer cores) which differ from one another in hardness and/or density, although all of the layers (or the central part and peripheral parts) should contain polybutadiene having more than 40% of cis-1,4 bonds and an unsaturated carboxylic acid and/or a metal salt thereof to crosslink the polybutadiene and deforms 1.5 to 3.5 mm under a constant load of 100 kg, and should not differ more than 10% in hardness from one another. By enclosing the core of the layered structure with a cover, multi-layered golf balls such as three-piece golf balls are formed.

The solid core should be formed such that the diameter is 36.8-41.0 mm and the weight is 34.5-43.5 g if it is for large size balls, and the diameter is 38.3-42.3 mm and the weight is 34.5-43.0 g if it is for small size balls.

The solid golf ball of the present invention has a cover that encloses the solid core. This cover is made of a termoplastic resin and is composed of two layers, i.e., an inner layer and an outer layer.

The inner layer that directly encloses the solid core is made of a comparatively soft thermoplastic resin. It should have a stress of 20-100 kg/cm$^2$, preferably 30-90 kg/cm² at 10% elongation. The stress at 10% elongation is measured according to ASTM 638-86 which is hereby incorporated by reference. It should also have a resilience higher than 40%, preferably higher than 45% measured by a Dunlop tripsometer which is defined in British Standard No. 903. The inner layer should be 0.1–2 mm thick, preferably 0.3–1.5 mm thick. If the stress at 10% elongation is smaller than 20 kg/cm², the resulting golf ball is poor in the coefficient of restitution and durability; and if it is greater than 100 kg/cm², the resulting golf ball is poor in controlability. If the inner layer is thinner than 0.1 mm, the formation of dimples may be difficult and the resulting golf ball may be poor in durability. If the inner layer is thicker than 2 mm, the resulting golf ball is poor in the efficiency of restitution.

The thermoplastic resin for the inner layer includes, for example, ionomer resin, polyester elastomer, polyamide elastomer, thermoplastic urethane elastomer, propylene-butadiene copolymer, 1,2-polybutadiene, polybutene-1, and styrene-butadiene block copolymer. They may be used individually or in combination with one another. Preferable among them are ionomer resin, polyester elastomer, and blended materials thereof.

The polyester elastomer includes, for example, polyether-ester block copolymer, polylactone-ester block copolymer, and aliphatic and aromatic dicarboxylic acid copolymerized polyesters. The polyether-ester block copolymer is composed of a polyester hard segment and a polyether soft segment. The former is constructed of a dicarboxylic acid and a low-molecular weight diol component, and the latter is an alkylene glycol polymer having 2 to 10 carbon atoms. The dicarboxylic acid component should contain more than 40 mol % of aromatic dicarboxylic acid such as terephthalic acid. This is desirable for mechanical properties such as breaking strength and resilience. The low-molecular weight diol component is one or more than one kind of aliphatic and aromatic diol having 2 to 10 carbon atoms. The polylactone ester block copolymer is one which is obtained from the soft segment of the polyether-ester block copolymer in which the polyether is replaced by the polylactone chain. The aliphatic and aromatic dicarboxylic acid copolymerized polyesters are usually a copolymer composed of an acid component and at least one type of diol component. The acid component includes an aromatic dicarboxylic acid (such as terephthalic acid and isophthalic acid) and an aliphatic dicarboxylic acid having 2 to 10 carbon atoms, and the diol component is selected from aliphatic an aromatic diols having 2 to 10 carbon atoms. A blend of an aromatic polyester and an aliphatic polyester can also be used in the present invention.

The outer cover layer enclosing the above-mentioned inner layer is formed from a hard thermoplastic resin. It should have a flexural modulus of 2000–5000 kg/cm², preferably 2500–4500 kg/cm², measured according to ASTM D 790, Method I, Procedure B, which is hereby incorporated by reference, a resilience of higher than 35%, preferably higher than 40%, measured by a Dunlop tripsometer, and a thickness of 0.1 to 1.5 mm, preferably 0.2 to 1.4 mm. With a flexural modulus smaller than 2000 kg/cm², the resulting golf ball spins excessively when hit by a wood club. This impairs the flight performance which is a feature of the solid golf ball for amateur golfers. Conversely, with a flexural modulus greater than 5000 kg/cm², the resulting golf ball is poor in controllability when hit by an iron club. If the outer cover layer is thinner than 0.1 mm, the improvement of spin characteristics by a hard resin is not achieved and the resulting solid golf ball is poor in flight performance and durability, if it is thicker than 1.5 mm, the resulting golf ball is improved only little in controlability.

The thermoplastic resin for the outer layer includes, for example, ionomer resin, polyester elastomer, polyamide elastomer, thermoplastic urethane elastomer, propylene-butadiene copolymer, 1,2-polybutadiene, and styrene-butadiene copolymer. They may be used individually or in combination with one another. Preferable among them are ionomer resin and polyester elastomer.

The preferred ionomer resin is a polymer which is composed of a monoolefin and one or more members selected from $C_3$–$C_8$ unsaturated mono- and dicarboxylic acids and esters thereof and is crosslinked with metallic ions.

The cover made up of an inner layer and an outer layer as mentioned above should have a total thickness of 0.4 to 2.2 mm, preferably 0.5 to 2 mm. The ratio of the inner layer thickness to the outer layer thickness should preferably be 1:3 to 5:1.

The solid core can be molded in the usual way such as compression molding and injection molding from a mixture of the raw materials for the solid core. The mixing may be accomplished by using, for example, a Banbury mixer or roll mill. The molded product is heated for crosslinking. The heating temperature is 120° to 180° C. in the case where the core material is incorporated with dicumyl peroxide. The layered core can also be formed in the same manner.

The solid core can be enclosed with the cover in any manner. According to one method, for example, the double-layered cover is formed in paired hemispheres and they are made integral by heat-molding on the solid core. According to another method, the inner layer and outer layer are formed on the solid core by injection molding on top of the other.

The solid golf ball of the present invention should be formed such that the inner cover layer adheres closely to the solid core and the outer cover layer adheres closely to the inner cover layer. If adhesion between them is insufficient, the resulting ball is poor in durability and the coefficient of restitution. The close adhesion between the solid core and the inner cover layer can be achieved easily by the same manner as used for the conventional two-piece golf ball.

Furthermore, film adhesion between the inner cover layer and the outer cover layer can be achieved by applying a proper adhesive to the surface of the inner cover layer. Good close adhesion is achieved in the case where the material of the inner cover layer is miscible with the material of the outer cover layer and they are capable of fusion bonding with each other. This condition is satisfied in the following cases. (1) Both the inner layer and the outer layer are made of the same polymer. (2) The inner layer is made of a blend of soft ionomer resin and soft polyester elastomer, and the outer layer is made of hard ionomer resin. (3) The inner layer is made of soft polyester elastomer and the outer layer is made of a blend containing a proper amount of hard ionomer resin. In the above cases (2) and (3), the miscibility of the inner and outer layers is controlled by polymer blending. The polymer blending can be achieved in the usual way. The inner and outer cover layers may be incorporated with a coloring agent and filler, if necessary.

The present invention is now described concretely with reference to the following examples and comparative examples, although the invention should not be limited to the examples.

EXAMPLES AND COMPARATIVE EXAMPLES

One-piece cores for large balls were prepared by compression molding at 150° C. for 40 minutes. The molding compounds were prepared by mixing polybutadiene, zinc acrylate, zinc oxide, and dicumyl peroxide according to the formulation shown in Table 1 by using a Banbury mixer and roll mill.

The solid core was enclosed with the inner cover layer by injection molding from the material shown in Table 1. The inner cover layer was further enclosed with the outer cover layer by compression molding which had previously formed in hemisphere from the compound shown in Table 1. Thus there were obtained six types of large-sized two-piece golf balls having the characteristic properties as shown in Examples 1 to 6 in Table 1. The large sized two-piece golf balls in Comparative Examples 1 and 2 were prepared by forming the cover layer on the solid core by injection molding. The material of the cover layer is shown in Table 1.

The golf balls thus prepared were examined for characteristic properties according to the following test method.

For comparison, a commercial Surlyn-covered thread-wound golf ball (42.80 mm in diameter, with a 2.0 mm thick cover, made by Bridgestone Corporation) was examined in Comparative Example 3 and commercial balata-covered thread-wound golf ball (42.75 mm in diameter, with a 1.80 mm thick cover, made by Bridgestone Corporation) was examined in Comparative Example 4.

The results are shown in Table 1.

The characteristic properties of golf balls were evaluated as follows:

Initial velocity and spin:

Measured by photographic method by hitting a sample ball using a swing robot (made by True Temper Co., Ltd.)

Fatigue resistance and cut resistance:

<Cut resistance>

A ball is hit with a seventh iron under a pressure of 7 kg/cm$^2$ using a swing machine. The surface of the ball was visually observed for flaw marks.

<Fatigue resistance>

Using a throwing machine, a ball is thrown at an initial speed of 70 m/sec. against a rubber wall spaced 1.5 m from the machine. Throwing operations were repeated until failure occured. Cracking of the cover constitutes failure.

The properties of cut resistance and fatigue resistance are expressed in relative value provided that the ball of Comparative Example 1 has a value of 100.

Controlability:

<Controlability>

Fifteen professional golfers hit balls (90 balls per one golfer) to evaluate these properties. The controlability is that of a ball when hit with an iron.

Evaluation is made in three ranks. For controlability E is excellent, G is good, and B is bad.

TABLE 1

| Items | Example No. 1 | 2 | 3 | 4 | 5 | 6 | Comparative Example No. 1 | 2 | 3 | 4 |
|---|---|---|---|---|---|---|---|---|---|---|
| Solid core | | | | | | | | | | |
| cis-1, 4-polybutadiene | 100 | 100 | 100 | 100 | 100 | 100 | 100 | 100 | Prior Art | Prior Art |
| Zinc acrylate | 35 | 35 | 35 | 35 | 35 | 33 | 33 | 35 | Golf Ball | Golf Ball |
| Zinc oxide | 2.5 | 4.5 | 8 | 12 | 13 | 15 | 17 | 17 | (Surlyn-covered | (Balata-covered |
| Dicumyl peroxide | 1.0 | 1.0 | 1.0 | 0.8 | 0.8 | 0.8 | 0.8 | 1.0 | thread-wound | thread-wound |
| Diameter (mm) | 41.8 | 40.9 | 39.9 | 39.8 | 39.8 | 38.8 | 38.3 | 38.3 | golf ball) | golf ball) |
| Deformation (mm) *1 | 2.3 | 2.2 | 2.3 | 2.8 | 2.8 | 3.1 | 3.0 | 2.3 | | |
| Inner cover layer | | | | | | | | | | |
| Ionomer resin | 100 | — | 30 | 30 | 80 | 70 | — | 100 | | |
| Polyester elastomer *2 | — | 100 | 70 | 70 | 20 | 30 | — | — | | |
| Titanium dioxide | 2 | 2 | 2 | 2 | 2 | 2 | — | 2 | | |
| Stress at 10% elongation (kg/cm$^2$) | 80 | 65 | 40 | 40 | 30 | 60 | — | 80 | | |
| Resilience (%) | 45 | 56 | 60 | 60 | 62 | 45 | — | 45 | | |
| Thickness (mm) | 0.3 | 0.5 | 1.3 | 0.5 | 1.0 | 0.8 | — | 2.2 | | |
| Outer cover layer | | | | | | | | | | |
| Ionomer resin | 100 | — | — | 100 | 90 | 100 | 100 | — | | |
| Polyester elastomer | — | 100 | 100 | — | 10 | — | — | — | | |
| Titanium dioxide | 2 | 2 | 2 | 2 | 2 | 2 | 2 | — | | |
| Flexural modulus (kg/cm$^2$) | 4000 | 3100 | 2500 | 3750 | 3600 | 4000 | 3750 | — | | |
| Resilience (%) | 54 | 45 | 51 | 53 | 52 | 54 | 53 | — | | |
| Thickness (mm) | 0.2 | 0.5 | 0.2 | 1.0 | 0.5 | 1.4 | 2.2 | — | | |
| Total cover thickness (mm) | 0.5 | 1.0 | 1.5 | 1.5 | 1.5 | 2.0 | 2.2 | 2.2 | | |
| Physical properties of ball | | | | | | | | | | |
| Deformation (mm) *1 | 2.2 | 2.1 | 2.3 | 2.6 | 2.7 | 2.8 | 2.6 | 2.2 | 2.5 | 2.3 |
| Weight (g) | 45.3 | 45.5 | 45.4 | 45.6 | 45.5 | 45.4 | 45.4 | 45.6 | 45.5 | 45.6 |
| Initial velocity (m/s), driver | 65.3 | 65.2 | 65.4 | 65.1 | 65.2 | 64.9 | 64.7 | 63.4 | 64.6 | 64.8 |
| Spin (rpm), driver | 3750 | 3650 | 3800 | 3600 | 3700 | 3600 | 3500 | 4300 | 4500 | 4900 |
| Spin (rpm), 7-iron | 7800 | 7500 | 7750 | 7000 | 7700 | 6500 | 4900 | 6900 | 7500 | 8100 |
| Fatigue resistance (index) | 98 | 97 | 100 | 97 | 105 | 100 | 100 | 100 | 45 | 60 |
| Cut resistance (index) | 95 | 97 | 98 | 100 | 100 | 100 | 100 | 99 | 75 | 35 |
| Controlability, iron | E | E | E | G | E | G | B | E | E | E |

Note to Table 1.
*1: Deformation under a constant load of 100 kg.
*2: Polyester elastomer composed of terephthalic acid, 1,4-butanediol, isophthalic acid, and polytetramethyleneoxide glycol.

It is noted from Table 1 that, as compared with the golf ball of Comparative Example 1 which is a conventional two-piece golf ball having a one-layer hard cover, the invention golf balls have improved initial velocity which will give improved flying distance. With respect to the spin characteristic upon hitting the ball with a 7th iron, the invention golf balls show 130 to 160% increase as compared with the golf ball of Comparative Example 1, and therefore the invention golf balls are superior in controlability than the conventional two-piece golf ball. Further, the invention golf balls have substantially the same fatigue resistance and cut resistance as the golf ball of Comparative Example, i.e. the conventional two-piece golf ball and thus have good durability.

The golf ball of Comparative Example 2 which is a two-piece golf ball having a one-layer soft cover has almost the same spin characteristic by a 7th iron as the invention golf balls. However, the golf ball of Comparative Example 2 has much spin by a driver and small initial velocity as compared with the invention golf balls. Therefore, the golf ball of Comparative Example 2 will be inferior in flying distance than the invention golf balls.

Although the conventional thread-wound golf balls of Comparative Examples 3 and 4 have good spin characteristic by a 7th iron, they have remarkably inferior fatigue resistance and cut resistance resulting in worse durability.

On the other hand, the solid golf ball of the invention has improved flight performance, spin characteristics, efficient of restitution, controlability, and fatigue resistance.

What is claimed is:

1. A solid golf ball comprising a solid core and a cover enclosing said solid core, characterized in that said solid core is one which contains polybutadiene rubber having more than 40% of cis-1,4 bonds and an unsaturated carboxylic acid and/or a metal salt thereof to crosslink the polybutadiene rubber and deforms 1.5 to 3.5 mm under a constant load of 100 kg, and said cover is a 0.4 to 2.2 mm thick which consists of a 0.1 to 2 mm thick inner layer and a 0.1 to 1.5 mm thick outer-layer enclosing the inner layer, both made of thermoplastic resins, said inner layer having a stress of 20 to 100 kg/cm$^2$ at 10% elongation measured according to ASTM 638-86 and having resilience higher than 40% measured by a Dunlop tripsometer which is defined in British Standard No. 903, and said outerlayer having flexural modulus of 2000 to 5000 kg/cm$^2$ measured according to ASTM D 790 and a resilience higher than 35% measured by a Dunlop tripsometer as defined above.

2. The golf ball as claimed in claim 1 wherein the difference between the hardness at the center of said solid core and the hardness at the outside of said solid core is less than 10%.

3. The golf ball as claimed in claim 1 wherein said solid core is one which contains polybutadiene rubber having more than 85% of cis-1,4 bond and an unsaturated carboxylic acid and/or a metal salt thereof to crosslink the polybutadiene rubber and deforms 1.8 to 3.2 mm under a constant load of 100 kg.

4. The golf ball as claimed in claim 1 wherein said solid core contains said polybutadiene rubber and at least one rubber selected from the group consisting of styrene-butadiene rubber, natural rubber and isoprene rubber, and the amount of said polybutadiene rubber being more than 50% by weight of all of the rubbers.

5. The golf ball as claimed in claim 1 wherein the amount of the unsaturated carboxylic acid or metal salt thereof is 10 to 60 parts by weight for 100 parts by weight of said polybutadiene rubber.

6. The golf ball as claimed in claim 1 wherein said cover is a 0.5 to 2 mm thick which consists of a 0.3 to 1.5 mm thick inner layer and a 0.2 to 1.4 mm thick outer layer enclosing the inner layer, said inner layer having a stress of 30 to 90 kg/cm$^2$ at 10% elongation and having a resilience higher than 45%, and said outer layer having a flexural modulus of 2500 to 4500 kg/cm$^2$ and a resilience higher than 40%.

7. The golf ball as claimed in claim 1 wherein said inner layer comprises at least one thermoplastic resin selected from the group consisting of ionomer resin, polyester elastomer, polyamide elastomer, thermoplastic urethane elastomer, propylene-butadiene copolymer, 1,2-polybutadiene, polybutene-1 and styrene-butadiene block copolymer, and said outer layer comprises at least one thermoplastic resin selected from the group consisting of ionomer resin, polyester elastomer, polyamide elastomer, thermoplastic urethane elastomer, propylene-butadiene copolymer, 1,2-polybutadiene and styrene-butadiene copolymer.

8. The golf ball as claimed in claim 1 wherein the ratio of the inner layer thickness to the outer layer thickness is 1:3 to 5:1.

9. The golf ball as claimed in claim 1 wherein said unsaturated carboxylic acid and/or metal salt thereof is respectively acrylic acid or methacrylic acid and/or a divalent metal salt thereof.

10. The golf ball as claimed in claim 1, wherein said metal salt of said carboxylic acid is zinc acrylate or zinc methacrylate.

* * * * *